(12) United States Patent
Ersson

(10) Patent No.: US 6,452,509 B2
(45) Date of Patent: *Sep. 17, 2002

(54) DEVICE AND METHOD FOR SIGNALLING AT A RUNWAY

(75) Inventor: Yngve Anders Ersson, Sundbyberg (SE)

(73) Assignee: Försvarets Materielverk, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/462,091

(22) PCT Filed: Jul. 13, 1998

(86) PCT No.: PCT/SE98/01382

§ 371 (c)(1),
(2), (4) Date: Apr. 3, 2000

(87) PCT Pub. No.: WO99/02403

PCT Pub. Date: Jan. 21, 1999

(30) Foreign Application Priority Data

Jul. 11, 1997 (SE) ................................................ 9702701

(51) Int. Cl.[7] ............................... B64F 1/20; G08G 5/00
(52) U.S. Cl. .................... 340/951; 340/908.1; 359/527; 359/530
(58) Field of Search .............................. 340/951, 908.1, 340/983, 525, 958, 982; 359/527, 528, 530, 531, 532, 538, 551, 552, 553

(56) References Cited

U.S. PATENT DOCUMENTS

| | | | | |
|---|---|---|---|---|
| 3,934,065 A | * | 1/1976 | Tung | ........................ 428/241 |
| 4,846,549 A | * | 7/1989 | Gutsche | ...................... 350/101 |
| 5,050,327 A | * | 9/1991 | Woltman | ...................... 40/582 |
| 5,128,804 A | * | 7/1992 | Lightle et al. | ............... 359/536 |
| 5,335,112 A | * | 8/1994 | Bennett et al. | .............. 359/527 |
| 5,557,460 A | * | 9/1996 | Bennett | ....................... 359/530 |
| 5,751,226 A | * | 5/1998 | Hretsina | .................. 340/908.1 |
| 5,759,671 A | * | 6/1998 | Tanaka et al. | ............... 359/533 |
| 5,818,640 A | * | 10/1998 | Watanabe et al. | ............ 359/527 |
| 6,007,219 A | * | 12/1999 | O'Meara | ..................... 362/259 |
| 6,280,057 B1 | * | 8/2001 | O'Meara | ..................... 362/259 |

FOREIGN PATENT DOCUMENTS

| | | |
|---|---|---|
| DE | 24 22 347 | 11/1975 |
| DE | 34 30 687 | 3/1986 |
| DE | 195 49 374 | 2/1997 |

* cited by examiner

Primary Examiner—John Tweel
(74) Attorney, Agent, or Firm—Jacobson Holman, PLLC

(57) ABSTRACT

The invention relates to a device and a method for supplying information to pilots, especially in poor visibility, about, for instance, the borders of a runway (1). Along the long sides of the runway and at its beginning and end, signal means (2, 5) are arranged, which are translucent to e.g. UV radiation and which comprise a fluorescent material which converts the radiation penetrated by illumination into visible light. In the daytime, the UV radiation originates from sunlight. The converted light will then reinforce the usual light from the signal means, which originates from the sun's illumination thereof with visible light. As a result, It will be much easier to observe the signal means especially against the light. It is further suggested according to the invention that at night the signal means are illuminated by UV searchlights (34, 35). By a great number of signal means being illuminated simultaneously by a small number of searchlights, a great amount of electric equipment and installation work can be avoided. It is suggested that the signal means be made as flat screens in the form of square or rectangular pieces of plastic sheeting expanded between poles.

22 Claims, 2 Drawing Sheets

DEVICE AND METHOD FOR SIGNALLING AT A RUNWAY

BACKGROUND OF THE INVENTION

1. Field of the Invention

The invention relates to a device and a method for signalling in connection with runways. The device and the method are intended to give pilots of aircraft, helicopters etc. information especially at night and in case of poor visibility about the borders of a runway, doors, traffic regulations and the like.

2. Prior-Art

When using known methods for this kind of signalling, use is in most cases made of devices with signal means such as light signs and signal lights. The latter are, for instance, signal lights of different colors showing the approach lane of the airport as well as the beginning, edges and end of the runway. The signal means are supplied with current and controlled in their functions by means of cables and other electric equipment. The signal means and the associated equipment in the device are expensive to purchase, install and maintain. For instance, in international relief work, it is sometimes necessary to use airfields, the ordinary signalling device of which has been destroyed or does not exist at all. An emergency device must then be sent to the airfield and installed to enable the field to be used also when the visibility is not optimal. Since such a device is heavy and bulky, it requires great freight capacity in relief consignments. Moreover, much more work is necessary for the installation.

SUMMARY OF THE INVENTION

Technical Problem

The object of the invention is to provide a method and a device, both mentioned in the introduction, for signalling at runways, The device should:

- be simple and inexpensive to buy, install and maintain
- allow quick installation in an emergency airfield or an airfield with its ordinary signalling device destroyed
- be light and require little space to allow quick transportation to the location of use
- consume a small amount of power to make it possible to use small power plants.

This object is achieved by the device and the method being given the characteristic features that appear from a signalling device for placement adjacent to a runway comprising an essentially permanent sheet-shaped structure with two opposite boundary surfaces fixed in an orientation relative to the runway. The signal means is sheet-shaped with two opposite boundary surfaces and comprises a structure material of color pigment adapted to reflect light in a visible area and, on the other hand, pigment of a wavelength-converting material, is adapted to emit, from an activating radiation, visible light of approximately the same as the reflected light from the color pigments. The signal means is arranged in such a manner that if at least part of an arbitrarily selected boundary surface are illuminated by the activating radiation, corresponding parts of the other boundary surface will emit the visible light emitted by the wavelength-converting material.

Also, the color pigment of the signal means and its pigment of the wavelength-converting material are jointly or each are separately contained in the signal means in one or more of the following ways: mixed into a matrix included in the polymer material, applied to one boundary surface, and applied to both boundary surfaces.

The signal means is arranged as a flat screen, and the screen is arranged vertically and perpendicularly to the longitudinal direction of the runway.

Alternatively, the signal means is made of a flexible material and adapted, when located adjacent to the runway, to be expanded to the permanent shape by a support. Two poles are arranged vertically adjacent to the runway, and the signal means is adapted to be expanded to a flat screen between the poles. The signal means is arranged to be in omnidirectional, for instance, by being made as a tube which can be closed at the upper end, or the signal means is adapted to be expanded by the support to a dimensionally stable, possibly truncated, cone.

A lighting device is provided and comprises a source of radiation for activating radiation. The source of radiation is adapted to illuminate a plurality of signal means simultaneously, and a first and a second signal means, as well as a first and a second source of radiation is provided, each illuminating the two signal means. The signal means and the sources of radiation being arranged such that if the distance between the first source of radiation and the first signal means is greater than the distance between the first source of radiation and the second signal means, the distance between the second source of radiation and the first signal means is to be smaller than between said second source of radiation and the second signal means.

In the device, the structure material is a polymer material and the active radiation is UV light. The pigment of a wavelength-converting material is a fluorescent material.

An activating radiation is allowed to illuminate one of the boundary surfaces of the signal means and is converted into of a different wavelength, which from the boundary surface of the signal means is shown with a predetermined color to a flying observer. The activating radiation is normally invisible to the observer, and that the converted radiation is visible to him. The signal means is illuminated from two directions, in case of flat signal means both towards its front and towards its back.

According to the invention it is suggested that the individual signal means, for instance, those used to show the borders of the runway, be supplied with energy by being illuminated by some radiation of a form of energy that preferably cannot be perceived by the pilots to prevent them from being disturbed by the radiation. The signal means convert in their turn this radiation energy to radiation that can be perceived by the pilots. In the preferred embodiment, use is made of UV light from e.g. UV lamps as energy radiators. Normally this light cannot be perceived by pilots. However, by letting the signal means contain a fluorescent material, these means can convert the UV light into visible light. Depending on what material the signal means contain, the signal means can be made to emit different signal colors. Instead of UV light, IR light can be used. This light would then be converted into light having a shorter wavelength by the signal means so as to make it perceivable.

If it is desirable that the signal means emit radiation that is to be perceived by the own pilots only, it is possible to use, for instance, UV light or IR light which can be converted into light having a longer or shorter wavelength that can be perceived only by those pilots who are equipped with appropriate visual instruments.

The signal means could in fact contain a fluorescent material that is non-translucent, but according to the invention a translucent material is preferred that allows the energy radiators illumination to pass. This results in the advantages that an object acting as signal means can emit light also from a side that is not directly illuminated from the front and that radiation to some extent can penetrate means and reach other signal means shaded by these means.

The signal means should be sheet-shaped with two opposite boundary surfaces and comprise a polymer material and on the one hand common color pigment which is adapted to reflect light in the visible area and, on the other hand, pigment of a wavelength-converting material, e.g. a fluorescent material, which is adapted to emit, from an activating radiation, such as UV light, visible light of approximately the same color as said reflected light from the color pigments. Moreover, the signal means should be arranged in such a manner that if at least parts of an arbitrarily selected boundary surface are illuminated by said activating radiation, corresponding parts of the boundary surface will emit the visible light emitted by the wavelength-converting material.

The color pigment of the signal means and its pigment of the wavelength-converting material should jointly or each separately be contained in the signal means, for instance, in one or more of the following ways: mixed into a matrix included in the polymer material, applied to one boundary surface and applied to both boundary surfaces. According to the selected amounts of the different types of pigment for a certain volume of the matrix, the properties of these pigments and the original translucency of the matrix, the signal means will, in certain light and other radiation conditions, emit and let through different amounts of reflected light and converted light, respectively. The correct composition for a predetermined purpose can only be obtained by testing different alternatives.

As material contained in the signal means, a rigid material, such as rigid plastic panels, can be used. For an easily transported device, however, it is preferred that the signal means be made of a flexible sheet-shaped material which can be a fiber material, such as a fabric cloth or a plastic-coated cloth, but which in the embodiment, for reasons of cost and production, has been chosen to be a plastic sheeting which can be fiber-reinforced. In the manufacture of this plastic sheeting, use can be made of a plastic, e.g. styrene, ethylene or PVC plastic, which is translucent to radiation of wavelengths within a wide range. Into this basic material, on the one hand common color pigments giving the sheeting a certain color in daylight that is reflected and penetrated by radiation and, on the other hand, pigments of a fluorescent material which gives a converted light that preferably has approximately the same color as the above-mentioned daylight color of the sheeting.

Plastic sheeting of the above-mentioned type is, depending on its quality, penetratable by UV and similar radiation to different degrees. From this point of view, the thickness of the sheeting in the thicknesses involved is insignificant. The dimensioning should therefore be effected on the basis of the mechanical stress to which the sheeting will be subjected. The thickness of the sheeting is to be selected, inter alia, with respect to the material and size of the signal means and its exposure to currents from the drive means of aircrafts. A thickness of 0.25–0.5 mm is usually sufficient for the PVC material of the preferred embodiment.

For a piece of limp plastic sheeting to be able to act as signal means, it should be given a flat surface of a certain minimum see. It should be arranged such that the normal of the surface is directed as far as possible towards an intended viewer. The greater the deviation from this angle, the smaller amount of light intensity reaches the viewer. The signal means of the invention should therefore have an essentially invariable, permanent shape and, in any case, for e.g. the screens of the preferred embodiment have an invariable, permanent orientation in relation to the runway, such that its character is not changed unintentionally. These requirements can be satisfied by the piece of sheeting being held expanded in a support which is designed and arranged in such manner that the piece of sheeting is correctly oriented.

On runways for aircraft it is common to have signal means in rows along the long sides of the field, The pieces of sheeting, which suitably are of square or rectangular shape, are there held preferably vertically expanded transversely of the longitudinal direction of the runway, such that their surfaces point at an approaching aircraft coming from one or the other direction in the longitudinal direction of the runway. It is possible to use as a support for each signal means a frame fixed in the ground or two parallel poles which are vertically fixed in the ground and are approximately of the same height and In which the corners of the piece of sheeting are fixed by means of e.g. rubber bands which are stretched straight outwards, By inclining the tips of the parallel poles, for example, towards the end of the runway, or changing their position in relation to the longitudinal direction of the runway, the light character of the signal means can be changed.

With a view to guiding pilots of helicopters, the signal means should, however, be omnidirectional and can then be designed as a cylinder, possibly with a closed upper end. The piece of sheeting can then be formed to a sector or a part of a circular ring, whose straight edges are joined. It is kept expanded by means of e.g. a wire frame similar to that in a lampshade to form a tone or a truncated cone, which is preferably straight, circular and vertical, like in the preferred embodiment. The frame that should allow good penetration by radiation, can comprise a pole stuck into the ground and a round ring in which the circular lower edge of the piece of sheeting is clamped. The signal means will produce radiation also against the light by the fact that activating radiation penetrates parts of the signal means that are facing the source of radiation and the inner space of the signal means, whereupon the radiation activates part of the signal means on the other side of this space, which emit the wavelength-inverted light For radiation of this kind of signal means, weak sources of radiation can be placed in the same.

In connection with runways for aircraft, the flat signal means, the screens, are arranged, inter alia, at the long sides of the runway and directed perpendicular to these sides. For short runways, 6–10 yellow or white signal means are used on each side. According to an embodiment of the invention, it is suggested that an energy radiator, such as a UV lamp, be allowed to illuminate a number of the converting signal means of the invention, in this case, for instance, 6–10, which consequently will each emit a signal light. This gives the advantage that only the single UV lamp requires electric equipment, not each of the 6–10 signal means as in prior-art technique. This means that a large part of the electric equipment, such as lamp fittings, cables and the like as well as the installation thereof can be excluded. In certain cases, it may be convenient to divide the function of the energy radiator between two energy radiators, such as two UV lamps like in the preferred embodiment. If these are combined to a unit or placed close to each other, the installation work does not increase significantly.

For all means to have the same luminous intensity although the transfer of energy decreases with the distance, it is further suggested that the number of signal means be illuminated from at least two positions located outside the area of the positioning of this number. The location of the positions is preferably such that if the distance between a first of these positions and a first signal means in the number is greater than the distance between the same position and a second signal means in the number, the distance between the second of these positions and the first signal means should be smaller than between this position and the second signal means. As a result, the reduction of the received energy from e.g. one UV lamp between two signal means will, owing to a longer distance to this lamp, be compensated for by an increase of the received energy from the other UV lamp owing to a smaller distance to this lamp.

Now assume that fluorescent signal means arranged in a row, for instance, the above-mentioned at the edge of the runway, are illuminated by two UV searchlights which have the same luminous intensity and which are arranged outside the to ends of the row. If the searchlights have such radiation characters that their luminous intensity decreases approximately linearly with the distance, all the signal means will receive in total the same effect and, consequently, have the same luminous intensity.

When using flat signal means, screens, it is most natural for the two searchlights to each illuminate one side of the screens, and to be positioned close to the extensions of the rows since the energy received by the means is at its maximum when the radiation occurs perpendicular to the sides. Moreover, the searchlights can then have narrow beams of light, which minimizes the power consumption. This kind of illumination can, of course, also be used in omnidirectional signal means.

It has been found that the above-mentioned translucent fluorescent signal means are highly effective also in daylight even if they are not illuminated by special energy radiators such as UV lamps. Especially when the sun is low in the morning and evening hours of the day, pilots must notice signal means against the bright light. They will then be blinded and will have difficulties in noticing prior-art signal means. With the inventive signal means, especially the fluorescent flat screens or cones, the UV light in sunlight, which illuminates the screens from behind, will cause fluorescence which is directed towards the pilots and which preferably is arranged to have the daylight color of the screen. This light considerably reinforces the visible light coming from the sun's illumination of the rear of the screen which is translucent also to daylight. Consequently, the screens will stand out sharply against the background and will be easy for the pilots to discover. It goes without saying that the effect is pronounced even if there is no opposite light and the sun illuminates the front of the screen, although not to the same pronounced degree. Also in this daylight case a converted light is obtained, whose activating radiation is invisible to the viewer. This light certainly just adds to the otherwise obtained light from the sun, but the UV light that exists in the sunlight is invisible to the viewer and does not contribute to making it difficult for the viewer to notice the signal means.

Only monochromatic means have been described above, However, a signal means can have a plurality of different colors. It may comprise multicolored fields, for instance, be divided into vertical red and yellow strips or exhibit a symbol or a character.

Advantages

With the invention, simple methods and means for signalling in runways are provided. The cost of a device and the installation thereof becomes much lower than for prior-art devices. If used as an emergency device, it can be transported and installed much more quickly since it has a much lower weight and requires less complicated electric arrangements, such as portable power plants, since the power consumption can be reduced to a considerable extent. This is due not only to the fact that a smaller number of energy supplying units are used, but also to the fact that since the surface of the signal means of the invention is much larger, this requires a smaller amount of totally emitted power to be observed. According to calculations, the cost of simple devices can be reduced to $\frac{1}{20}$ and the power consumption to $\frac{1}{5}$. The installation is much simpler than for prior-art devices, among other things, because about 2 km of electric wiring in airfields of the size shown in the preferred embodiment can be avoided.

In private airfields, the signal means of the invention can be installed without any energy radiators such as UV searchlights. Signal means, which are inexpensive and effective in the morning and in the evening as well as in case of haze and reduced visibility for other reasons, will be obtained at a low cost, Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

A preferred embodiment will now be described in more detail with reference to the accompanying Figures, the reference numerals of which designate equivalent parts in the Figures.

DESCRIPTION OF THE INVENTION

Figure 1:
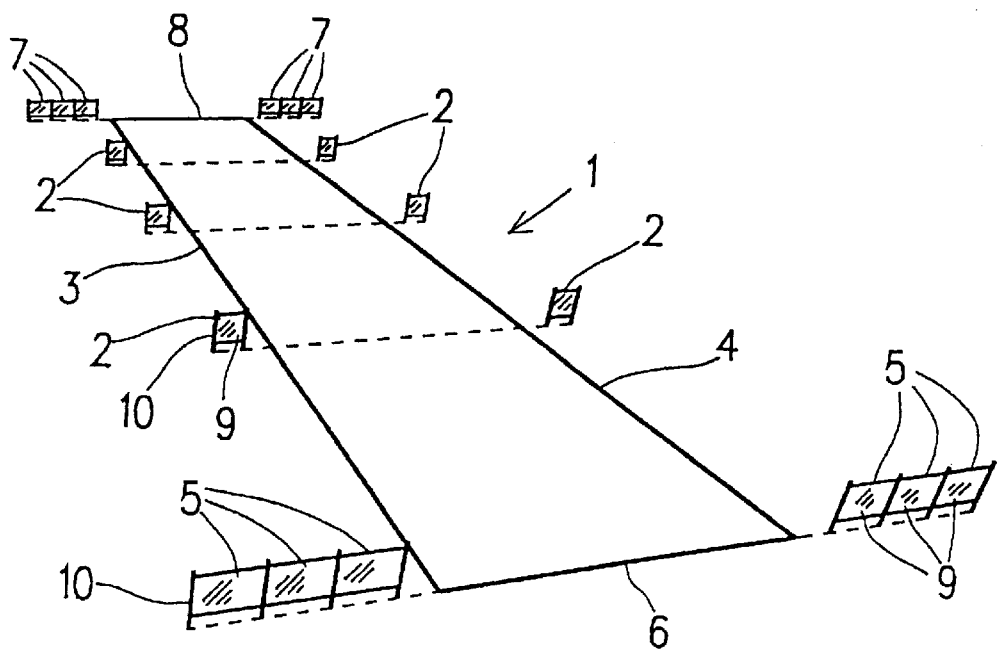
FIG. 1 is a perspective view of a device for signalling in a runway comprising the fit signal means of the invention. The runway is shown in a very shortened state for reasons of clarity.

In describing preferred embodiment of the present invention illustrated in the drawings, specific terminology is employed for the sake of clarity. However, the invention is not intended to be limited to the specific terminology so selected, and it is to be understood that each specific element includes all technical and functional equivalents which operate in a similar manner to accomplish a similar purpose. It is also important to note that like parts are referenced by the same reference numeral throughout.

Figure 2:
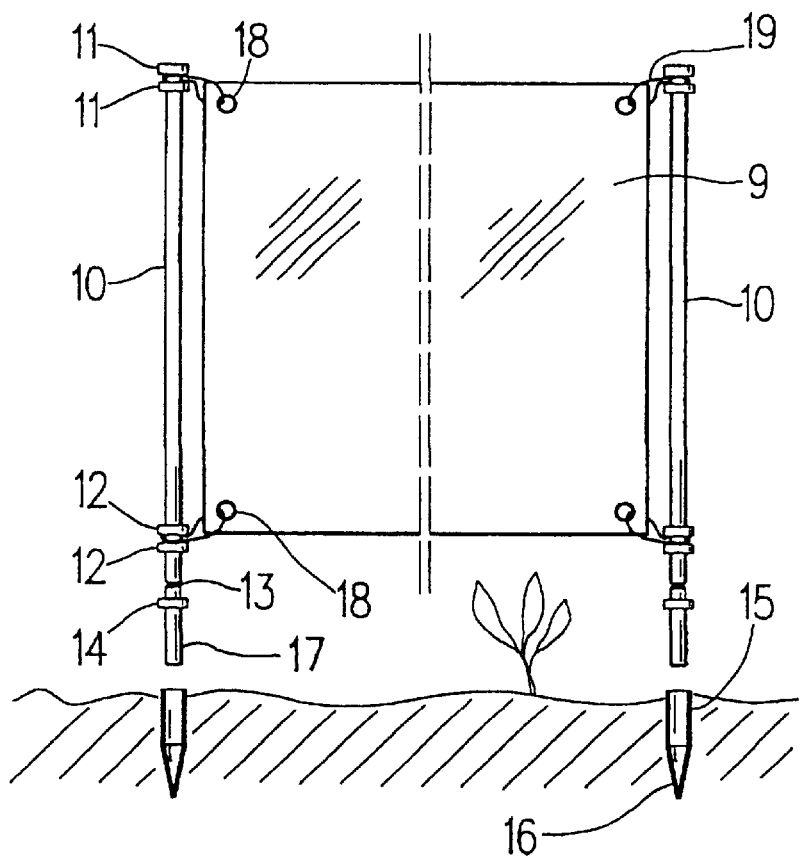
FIG. 2 is a detailed view of the signal means in FIG. 1.

In FIG. 1, a runway 1 is designated for aircraft. The runway is provided with a device for facilitating in the daytime recognition of the runway and increasing the safety in touchdown and take-off especially in case of poor visibility. The device comprises in most cases white or yellow signal means 2 for marking the edges 3 and 4 of the runway, green signal means 5 for marking the threshold 6 of the runway, and red signal means 7 for marking the end 8 of the runway. All signal means are of the inventive flat type as described above, screens, comprising a piece of square planar or, rectangular plastic foil or sheeting 9 of a fluorescent material in one of the above-mentioned colors. The plastic sheeting comprises a transparent matrix, in which, inter alia, pigments of the type described by way of introduction are admixed in the manufacture of the sheeting. With such a plastic sheeting, any of the lateral surfaces, as is normal for the inventive signal means, emits fluorescent light when the other lateral surface is illuminated with UV light. It goes without saying that such light is emitted also by the irradiated lateral surface. A screen is illustrated in FIG. 2 and will later be described in detail.

For a short runway with a length of about 800 m and a width of about 17 m, use is made of between 6 and 10 identical, white or yellow runway edge screens 2 at each edge of the runway, i.e. in total between 12 and 20 screens. They comprise square or planar pieces of sheeting with sides of a length of 1.2 m and are arranged about 2 m from the edge of the runway at equal distance from each other and the ends of the runway, in pairs on both sides of the runway in vertical planes which are perpendicular to the longitudinal direction of the runway.

Of a total of six used green rectangular identical threshold screens 5, three are placed in a juxtaposed manner on the extension of the runway threshold in one direction with the closest screen about 3 m from the edge of the runway. The three other screens are arranged correspondingly on the other extension of the threshold. The green threshold screens have a height of 1.2 m and a length of 2 m.

Finally, the red rectangular identical end screens 7 have a size and position corresponding to those of the threshold screens, although at the far end of the runway.

In case of considerable shifts of the wind, it may be necessary to alternate the direction of the approach, take-off and touchdown of the aircrafts. In provisional signalling devices, the easiest way is to change the places of the threshold and end screens. In permanent signalling devices, e.g. red screens can be arranged along a line just inside the green threshold screens at the same distance from the edge of the runway as these. If non-translucent screens are placed between the pairs of screens, i.e. between the green and the red screens, green light is shown in the extension of the runway and red light in the direction of the other end of the runway. A corresponding arrangement is provided at the other end of the runway.

FIG. 2 shows the flat signal means, the screens, of the device in FIG. 1. The square, planar or rectangular pieces of sheeting 9 are supported by poles 10 which are arranged at the lateral edges of the pieces of sheeting. Each pole is made of a round aluminum tube with an outer diameter of 40 mm and a length exceeding the height of the piece of sheeting by 20–30 cm. A pair of upper aluminum rings 11 with an inner diameter just exceeding the outer diameter of the tube are welded with an intermediate gap of about 1 cm to the tube at the upper end thereof. A pair of identical lower rings 12 are welded in the same manner to the tube at a distance from the upper rings which is slightly greater than the height of the piece of sheeting at issue. Just below the lower rings, the tube is formed with a turned groove 13 as a fracture line so as to facilitate the felling of the pole in case of a collision. Below the groove, a simple retaining ring 14 designed as the above-mentioned rings is welded to the tube.

To erect a pole, first a mounting 15 is driven into the ground. The mounting is a steel tube with an inner diameter of 41 mm and a length of 20 cm with a pointed end 16. Then the part 17 of the pole extending below the retaining ring is inserted into the mounting.

With a view to clamping the piece of sheeting to the pole, there are eyelets 18 in the corners of the piece of sheeting. Stretched rubber bands 19 are passed through the eyelets and round the pole in the gap between the respective pairs of rings. For the free-standing runway edge screens, use is made of two poles for each screen. Two juxtaposed threshold or end screens must share a pole placed between the screens.

Figure 3:
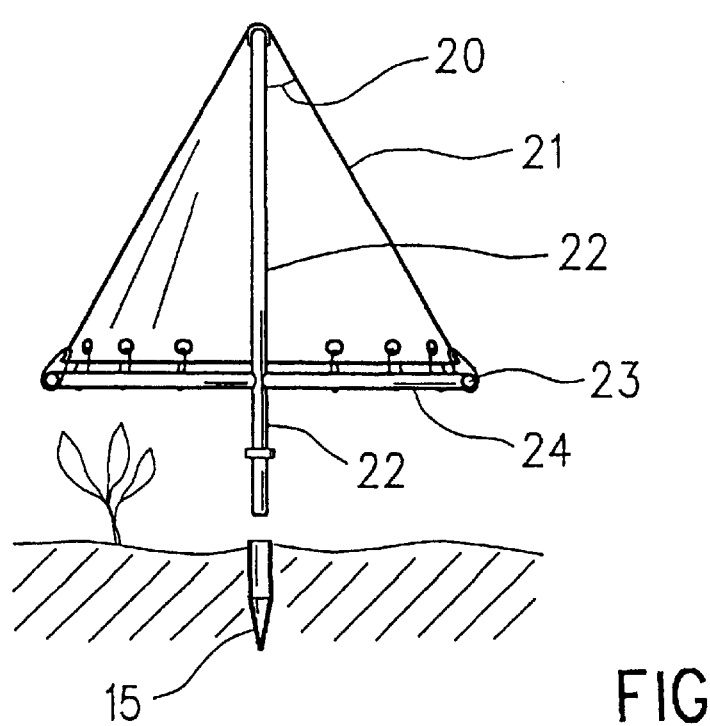
FIG. 3 illustrates a conical signal means for e.g. a device intended for a helicopter landing pad.

FIG. 3 shows a conical signal means for e.g. a device for signalling to helicopter pilots. A number of such means with a top angle 20 of about 30° are arranged in a ring around a helicopter landing pad. The signal means comprises a sector-shaped piece of sheeting 21, the straight sides of which are welded together to form a cone which in the Figure is shown in a section. The piece of sheeting is made of a fluorescent translucent material in one or more colors, specific to the runway. The cone is held expanded by a translucent frame comprising an aluminum tube 22 with the same diameter as the pole, a base ring 23, diameter 80 cm, of rounded aluminum tube, and a number of spokes 24 of aluminum which connect the ring with the tube 22. The frame is held by a mounting 15 of the same type as that of the pole. The cone is held expanded by its tip resting against the top of the tube 22 with an intermediate lining, and its lower edge is pulled towards the base ring 23 by means of eyelets at the edge and stretched rubber bands.

For use of the described runway in the night, but also in the daytime in case of poor visibility, the signalling device is extended according to the invention as described above under the heading of "solution". The extension comprises a device for activating illumination of the signal means with a radiation that normally cannot be perceived by pilots. The device will be a so-called intensity device for use in darkness but otherwise good visibility. It has a low weight and requires but a small space, among other things, because the screens can be rolled up, and therefore it is well suited to be parachuted for use as emergency or replacement device.

Figure 4:
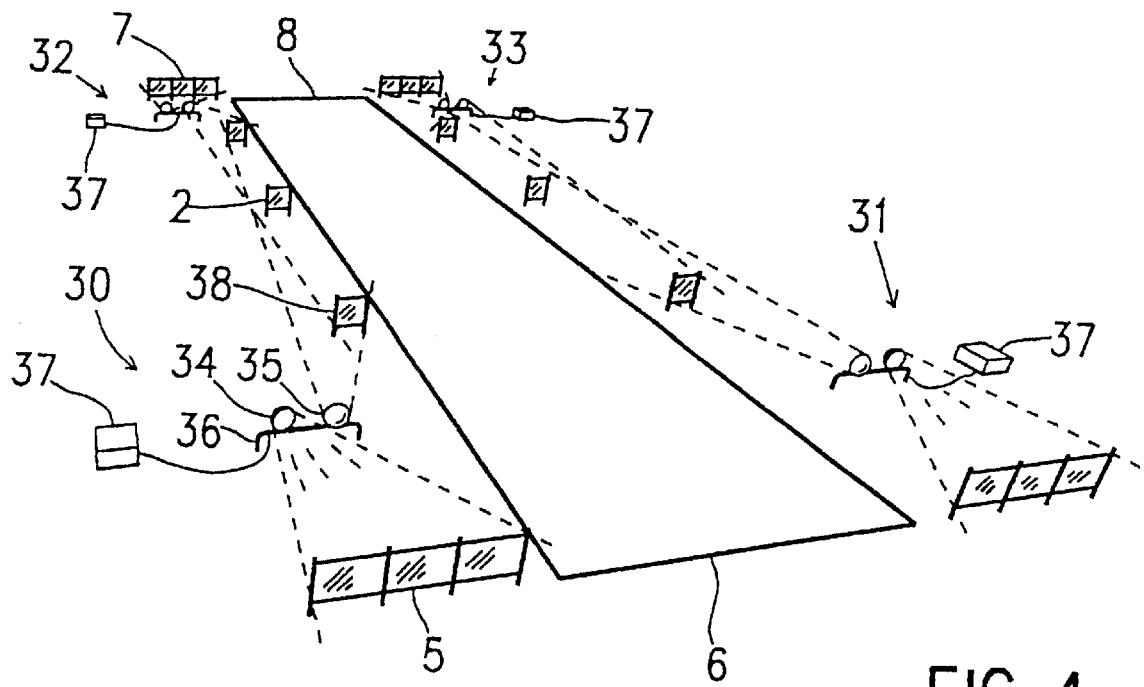
FIG. 4 illustrates the device in FIG. 1, the inventive illumination for activation of the signal means of the device being added.

The activating illumination is arranged with four lighting units, cf. numerals 30, 31, 32 and 33 in FIG. 4. Since the lighting units are identical and installed in the same way, only one of them will now be described.

The lighting unit 30 which is the closest one in FIG. 4 comprises two searchlights 34 and 35 which are adjustably fixed to the crosspiece of an inverted U-shaped yoke 36 made of the same kind of tube as the above-mentioned pole. The yoke is held up by the free tube ends, the legs being inserted into two mountings driven into the ground and of the type described above. Moreover, the lighting unit comprises a petrol-driven generator or a battery 37 which is connected to the searchlights by means of a cable.

The yoke with the searchlights is suitably placed such that none of the searchlights is concealed by the other and such that the yoke leg which is furthest away from the edge of the runway is located as far out as the outermost pole of the threshold screens and at a distance from the extension of the threshold corresponding to half the distance between the threshold 6 and the first runway edge screen 38.

The searchlights are of the type that emits ultraviolet light in the UVA range, 350–400 nm, and has the power of 200 W. One of the searchlights, e.g. the outer searchlight 34, is set with such a light cone angle and direction as to illuminate the three threshold screens 5 on the nearest side of the runway. The other searchlight 35 is set with such a light cone angle, height about the ground and direction as to illuminate all runway edge screens on the nearest side of the runway, i.e. all 6–10 screens. The light cone angles should only be as great as is necessary.

The latter searchlight 35 can be replaced with two searchlights, each having a light cone angle which is some-what greater than half the light cone angle of the replaced searchlight. By directing the light cones of these two searchlights in such a manner as to laterally jointly correspond to the cone of the replaced searchlight, the result will be a joint light cone with a smaller height of the cone and, thus, better utilization of the supplied searchlight power and the possibility of using still smaller generators.

The lighting unit 32 at the far end of the runway but on the same side thereof, of course, illuminates end screens 7 instead of threshold screens 5. Furthermore, it illuminates from behind the same runway edge screens as discussed above. With an illumination from two directions and relatively narrow cone angles, (N.B. the runway is much longer in relation to the width of the screens than shown in the Figure) the screens will obtain a light intensity which is great in relation to the supplied power an with a small difference between the different screens.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A signalling device for placed adjacent to a runway comprising:
    an essentially permanent sheet-shaped structure with two opposite boundary surfaces fixed in an orientation relative to the runway, a light device fixed in orientation relative to the runway for providing for providing a source of radiation, said sheet-shaped structure including material of color pigment adapted to reflect light in a visible area and a wavelength-converting material of another pigment adapted to emit, when provided with activating radiation a visible light of approximately the same color as said reflected light from the color pigment, said signalling device arranged in such a manner that if at least some parts of an arbitrarily selected boundary surface are illuminated by said activating radiation, corresponding parts of the other boundary surface will emit the visible light emitted by the wavelength-converting.

2. The device as claimed in claim 1, wherein said color pigment of said signalling device and said pigment of the wavelength-converting material are jointly contained in said signalling device in at least one of the following ways: mixed into a matrix included in the polymer material, applied to one boundary surface, and applied to both boundary surfaces.

3. The device as claimed in claim 1, wherein said signalling device being arranged as a flat screen, and said screen being arranged vertically and perpendicularly to a longitudinal direction of the runway.

4. The device as claimed in claim 1, wherein said signalling device is made of a flexible material and adapted, when located adjacent to the runway, to be expanded to a permanent shape by a support.

5. The device as claimed in claim 4, wherein said support comprises:
    two poles arranged vertically adjacent to the runway, and said signalling device being expanded to a flat screen between said two poles.

6. The device as claimed in claim 4, wherein said signalling device arranged in omnidirectional as a tube with an upper end which can be closed.

7. The device as claimed in claim 6, wherein said signalling device being adapted to be expanded by the support to a dimensionally stable cone.

8. The device as claimed in claim 7, wherein the source of radiation illuminates a plurality of signal means simultaneously.

9. A plurality of signalling devices for placement adjacent to a runway, each said signalling device comprising:
    an essentially permanent sheet-shaped structure with two opposite boundary surfaces fixed in an orientation relative to the runway, a structure material of color pigment adapted to reflect light in a visible area and a wavelength-converting material of another pigment adapted to emit from an activating radiation visible light of approximately the same color as said reflected light from the color pigment, said signalling device arranged in such a manner that if at least some parts of an arbitrarily selected boundary surface are illuminated by said activating radiation, corresponding parts of the other boundary surface will emit the visible light emitted by the wavelength-converting material;
    a lighting device for providing a source of radiation for activating radiation, and the source of radiation illuminates said plurality of signalling devices simultaneously; and
    said lighting device including a first and a second source of radiation, each said source of radiation illuminating at least one of said plurality of signalling devices, said signalling devices and said sources of radiation being arranged such that if the distance between the first source of radiation and the first signalling device is greater than the distance between said first source of radiation and the second signalling device, the distance between the second source of radiation and the first signalling device is to be smaller than between said second source of radiation and the second signalling devices.

10. The device as claimed in claim 9, wherein the structure material is a polymer material.

11. The device as claimed in claim 9, wherein the active radiation is UV light.

12. The device as claimed in claim 9, wherein the pigment of a wavelength-converting material is a fluorescent material.

13. A method for signalling at a runway, which comprises the steps of:
    placing a signalling structure having an essentially permanent sheet shape with two opposite boundary surfaces adjacent to the runway;
    fixing said signalling structure in an orientation relative to the runway;
    providing a structure material of color pigment for reflecting light in a visible area;
    providing a wavelength-converting material of another color pigment which is adapted to emit from an activating radiation visible light of approximately the same color as said reflected light from the color pigment;
    fixing a source of radiation adjacent to the runway for providing said activating radiation;
    said orientation fixing causing at least parts of an arbitrarily selected boundary surface to be illuminated by said activating radiation, and corresponding parts of the other boundary surface to emit the visible light emitted by the wavelength-converting material;
    allowing said activating radiation to illuminate one of the boundary surfaces of the signalling structure and, converting in the structure material light of a different wavelength, which from the boundary surface of said signalling device is shown with a predetermined color to a flying observer.

14. The method as claimed in claim 13, wherein the activating radiation is normally invisible to the observer, and that the converted radiation is visible to him.

15. The method as claimed in claim 13, further comprising the step of:

illuminating said signalling device from two directions.

16. The device as claimed in claim 6 wherein said signalling device is a tube closed at an upper end.

17. The device as claimed in claim 1, wherein said signalling device is expandable by the support to a dimensionally stable truncated cone.

18. The device as claimed in claim 9, wherein said color pigment of the signalling device and said pigment of the wavelength-converting material are each separately contained in the signal in at least one of the following ways: mixed into a matrix included in the polymer material, applied to one boundary surface, and applied to both boundary surfaces.

19. A signalling system for signalling a runway which comprises:

at least two signalling devices placed adjacent to a runway, said signalling devices including an essentially permanent planar-shaped structure with two separate boundary fixed in an orientation relative to the runway, said structure having a color pigment material for reflecting light in a visible area and a wavelength-converting material for emitting an activating radiation visible light of approximately the same color as said reflected light from the color pigment;

at least one lighting device fixed in orientation relative to the runway for illuminating said at least two signalling devices with said activating radiation; and said at least two signalling devices arranged in such an orientation that if at least some parts of an arbitrarily selected boundary surface are illuminated by said activating radiation provided by said lighting device, corresponding parts of the other boundary surface will emit the visible light emitted by the wavelength-converting material.

20. The system as claimed in claim 19, wherein the acive radiation is UV light.

21. The system as claimed in claim 19, wherein the pigment of the wavelength-converting material is a fluorescent material.

22. The device as claimed in claim 1, wherein the active radiation is UV light.

\* \* \* \* \*